(12) United States Patent
Pollet et al.

(10) Patent No.: US 11,613,829 B2
(45) Date of Patent: Mar. 28, 2023

(54) BEARING FOR A SHEDDING MACHINE OR MOTION TRANSMISSION SYSTEM, HEALD MOTION LEVER COMPRISING SUCH A BEARING AND SHEDDING MACHINE COMPRISING SUCH A LEVER OR SUCH A BEARING

(71) Applicant: STAUBLI FAVERGES, Faverges-Seythenex (FR)

(72) Inventors: Francois Pollet, Annecy le Vieux (FR); Sebastien Marion, Doussard (FR)

(73) Assignee: STAUBLI FAVERGES, Faverges-Seythenex (FR)

( * ) Notice: Subject to any disclaimer, the term of this patent is extended or adjusted under 35 U.S.C. 154(b) by 293 days.

(21) Appl. No.: 17/097,214

(22) Filed: Nov. 13, 2020

(65) Prior Publication Data

US 2021/0148014 A1  May 20, 2021

(30) Foreign Application Priority Data

Nov. 15, 2019 (FR) ...................................... 1912808

(51) Int. Cl.
*D03C 1/14* (2006.01)
*D03C 5/04* (2006.01)
(Continued)

(52) U.S. Cl.
CPC ............... *D03C 5/04* (2013.01); *D03C 1/144* (2013.01); *F16C 19/16* (2013.01); *F16C 19/36* (2013.01); *F16C 33/58* (2013.01); *F16C 2340/00* (2013.01)

(58) Field of Classification Search
CPC .. D03C 5/04; D03C 1/144; D03C 5/02; F16C 19/16; F16C 19/36; F16C 33/58;
(Continued)

(56) References Cited

U.S. PATENT DOCUMENTS 2,919,722 A * 1/1960 Alford .................... D03C 1/144
139/84
3,741,257 A * 6/1973 Kleiner .................. D03C 1/144
139/66 R
(Continued)

FOREIGN PATENT DOCUMENTS

CN        2459480 Y     11/2001
CN      107965517 A      4/2018
(Continued)

OTHER PUBLICATIONS

French Search Report dated Aug. 6, 2020, for French Application No. 1912808 filed Nov. 15, 2019.
(Continued)

*Primary Examiner* — Robert H Muromoto, Jr.

(57) ABSTRACT

Bearing for a shed-forming machine or a system for transmitting movement to the frames of a loom, which has an inner ring, an outer ring and rolling elements. The inner ring is centered on a major axis, has two lateral surfaces normal to the major axis, and defines a circular peripheral path centered on the major axis. The outer ring defines an inner path, which is circular and centered on the main axis. The rolling elements are interposed, radially with respect to the main axis, between the peripheral ring and the inner ring, to guide the outer ring in rotation relative to the inner ring around the main axis. The inner ring has at least one slot, opening onto the two lateral surfaces, extending opposite a portion of the peripheral path, and forms a bridge of material between the slot and the peripheral path.

23 Claims, 11 Drawing Sheets

(51) Int. Cl.
*F16C 19/16* (2006.01)
*F16C 19/36* (2006.01)
*F16C 33/58* (2006.01)
*F16C 33/76* (2006.01)

(58) Field of Classification Search
CPC ...... F16C 2340/00; F16C 19/06; F16C 19/26; F16C 33/586; D05C 5/00
See application file for complete search history.

(56) References Cited

U.S. PATENT DOCUMENTS

| | | | | |
|---|---|---|---|---|
| 3,750,713 | A * | 8/1973 | Titov | D03D 47/26 139/436 |
| 4,716,939 | A * | 1/1988 | Palau | D03C 5/02 74/569 |
| 5,671,781 | A * | 9/1997 | Palau | D03C 3/36 139/65 |
| 6,412,828 | B1 * | 7/2002 | Lacroix | F16L 37/22 285/86 |
| 7,506,668 | B2 * | 3/2009 | Vanderjeugt | D03C 1/16 139/81 |
| 7,748,291 | B2 * | 7/2010 | Pages | D03C 5/02 74/567 |
| 2009/0322076 | A1 * | 12/2009 | Tiberghien | F16L 37/248 285/313 |

FOREIGN PATENT DOCUMENTS

| | | |
|---|---|---|
| DE | 102008032718 B3 | 12/2009 |
| EP | 225266 A1 | 6/1987 |
| FR | 2590913 A | 6/1987 |
| FR | 2657892 A3 | 8/1991 |

OTHER PUBLICATIONS

International Search Report 19128080, dated Aug. 6, 2020, 2 Pages.

\* cited by examiner

BEARING FOR A SHEDDING MACHINE OR MOTION TRANSMISSION SYSTEM, HEALD MOTION LEVER COMPRISING SUCH A BEARING AND SHEDDING MACHINE COMPRISING SUCH A LEVER OR SUCH A BEARING

BRIEF SUMMARY OF THE INVENTION

The present invention relates to a bearing for a shed forming machine or for a system for transmitting movement to the frames of a loom, as well as to a weaving mechanism lever comprising such a bearing. The invention also relates to a shed forming machine, comprising such a lever or such a bearing.

BACKGROUND OF THE INVENTION

In the field of weaving, a loom crosses the warp and weft threads to make a fabric according to a weave. A shed forming machine controls the movements of the warp threads by means of heddles which are mounted on a heddle frame; several heddle frames being provided depending on the complexity of the weave of the fabric to be produced.

It is known to control each heddle frame individually, between a high position and a low position, by means of a mechanical transmission system, comprising pulling elements, namely connecting rods and levers. Some of the levers have rollers, fitted with bearings actuated by rotating cams. A shed forming machine grouping together the cams and other control members of the heddle frames is said to be of the "cam machine" type, while the mechanical transmission system connecting the shed forming machine and the heddle frames, located in the loom, is called a "movement transmission system", of the frames of the loom.

EP-A-0 225 266 teaches, for example, a cam machine lever structure, this lever comprising two rollers, actuated jointly by a rotary cam comprising two respective tracks. To reduce friction, each roller comprises a bearing, consisting of an inner ring and an outer ring in contact with a respective track of the cam, the outer ring being movable in rotation relative to the inner ring of the rolling bearing by means of rolling elements interposed between the inner and outer rings. The inner ring is solid and rigid. Such bearings, subjected to repetitive stresses, have a limited service life because of the fatigue of materials subjected locally to significant and repeated stresses.

For productivity reasons, a shed forming machine operates at high frequency: the cams rotate at high speed, the driving of a heddle frame between its two high and low positions places heavy strain on the pulling elements. Each roller, in particular, moves at high speed depending on the profile of a cam and is subjected to particularly high loads, which depend on the contact between a track of the cam and the outer ring of the roller and which are linked to defined accelerations defined by the cam profile. The movements of a shed forming machine, and therefore of its rollers, being alternating, the bearings of the rollers are subjected to repetitions of very localized force cycles on a load zone, which is conducive to material fatigue, premature damage to parts and may lead to breakage of roller components.

Due to the localized force on the roller during roller/cam contact, the outer ring of the bearing is loaded and tends to become oval, under the effect of a centripetal deformation at the level of the roller/cam load zone, and centrifugal deformation on sectors adjacent to the load zone. However, the inner ring of the bearing, being full and rigid, deforms very little or not at all, which, geometrically, leads to a loss of load contact or of the rolling elements outside the load zone, and an increase in load on the rolling element in the axis of the forces, which further exacerbates the effects of material fatigue of the rolling elements and the tracks.

The known approach to reducing material fatigue consists in using thicker, therefore heavier parts, which generate increased inertial effects, resulting in greater forces at the rolling element level, which limits the expected benefits in terms of reduction of material fatigue, therefore in terms of bearing life. These thicker parts may also pose problems of cost and sizing of the components of the bearing in a reduced space determined by the size of the machine.

It is these problems that the invention more particularly intends to remedy, by providing a bearing structure which allows a reduction in material fatigue during load cycles in a similar construction space.

To this end, the invention relates to a bearing intended for a shed forming machine or a system for transmitting movement to the frames of a loom. The bearing consists of an inner ring, an outer ring and rolling elements. The inner ring is centered on a major axis, has two side surfaces normal to the major axis, and defines a circular peripheral path centered on the major axis. The outer ring defines an inner path, which is circular and centered on the main axis. The rolling elements are interposed, radially with respect to the main axis, between the peripheral path and the inner path, so as to guide the outer ring in rotation relative to the inner ring around the main axis. According to the invention, the inner ring comprises at least one slot, which opens onto the two lateral surfaces, which extend opposite a portion of the peripheral path and which form a material bridge between the slot and the peripheral path. The material bridge extends over an angular sector of the inner ring, the angular sector being centered on the main axis of the ring and having a vertex angle greater than or equal to the vertex angle of an angular sector occupied by two rolling elements, preferably greater than or equal to the angle at the vertex of an angular sector occupied by five rolling elements, preferably greater than or equal to the vertex angle of an angular sector occupied by nine rolling elements, preferably still greater than or equal to the vertex angle of an angular sector occupied by thirteen rolling elements. The inner ring further comprises at least one hole for fixing the bearing.

Thanks to the invention, the inner ring, more precisely the material bridge located between the slot and the peripheral path, deforms elastically so as to ovalize the deformation of the inner ring and thus distribute the load over an Increased number of rolling elements compared to known bearings, thus limiting material fatigue and reducing the risk of premature damage and accidental breakage of parts. On the other hand, the loads supported by each rolling element are more homogeneous, which prevents stress peaks and further reduces material fatigue.

According to advantageous but not mandatory aspects of the invention, such a bearing may incorporate one or more of the following characteristics taken in any technically feasible combination:

- the angle at the vertex of the angular sector of the inner ring is greater than 20°, preferably greater than 70°, more preferably greater than 120°;
- the material bridge extends with a constant radial width and in an arc of a circle centered on the main axis of the inner ring;
- the radial width is substantially equal to a radial width of the slot;

the radial width of the material bridge is less than 30%, preferably less than 20%, more preferably less than 10% of a radius of the path of the peripheral path of the inner ring;

the slot extends between two rounded ends of diameter equal to the width of the slot;

the rolling elements are rollers;

the rolling elements are balls;

several slots are provided in the inner ring;

the ring includes two diametrically opposed slots with respect to the central axis;

the inner ring comprises a slot and two fixing holes.

The invention also relates to an output lever with cam mechanism follower rollers, the lever being equipped with two rollers. At least one of the rollers has a bearing as described above. The inner ring of the bearing is fixed on a core of the lever and/or on a flange attached to the lever by means of fixing elements, the outer ring having a peripheral ring with a circular profile.

The invention also relates to a cam type shed forming machine, in which the shed forming machine comprises an output lever as described above.

Advantageously, the output lever oscillates about a main axis of the cam machine between a high position and a low position as a function of a cam profile acting by contact on the peripheral track of one of the rollers, the contact being made in a radial load zone aligned with the angular sector of the inner ring in which the slot is formed.

According to another aspect, the invention finally relates to a shed forming machine of the cam machine type or of the dobby type, comprising a mechanical transmission system to the loom designed around articulations of axes parallel to each other, in which one of the articulations comprises a bearing as described above.

In addition, provision may be made for the material bridge to extend on each side of a center line directed according to the maximum intensity of the contact force between the roller and the cam, or directed according to the maximum radial force on one of the articulations of the transmission system which comprises a bearing, the maximum radial force corresponding to the radial load applied to the rolling elements, the highest during a shed formation cycle.

BRIEF DESCRIPTION OF THE DRAWINGS OF THE INVENTION

The invention will be better understood, and other advantages thereof will become more apparent in the light of the description which follows, of three embodiments of a bearing according to the invention, of an output lever with follower rollers according to the invention, and of a shed forming machine also according to the invention, given only by way of example and made with reference to the accompanying drawings, in which.

DETAILED DESCRIPTION OF THE INVENTION

Figure 1:
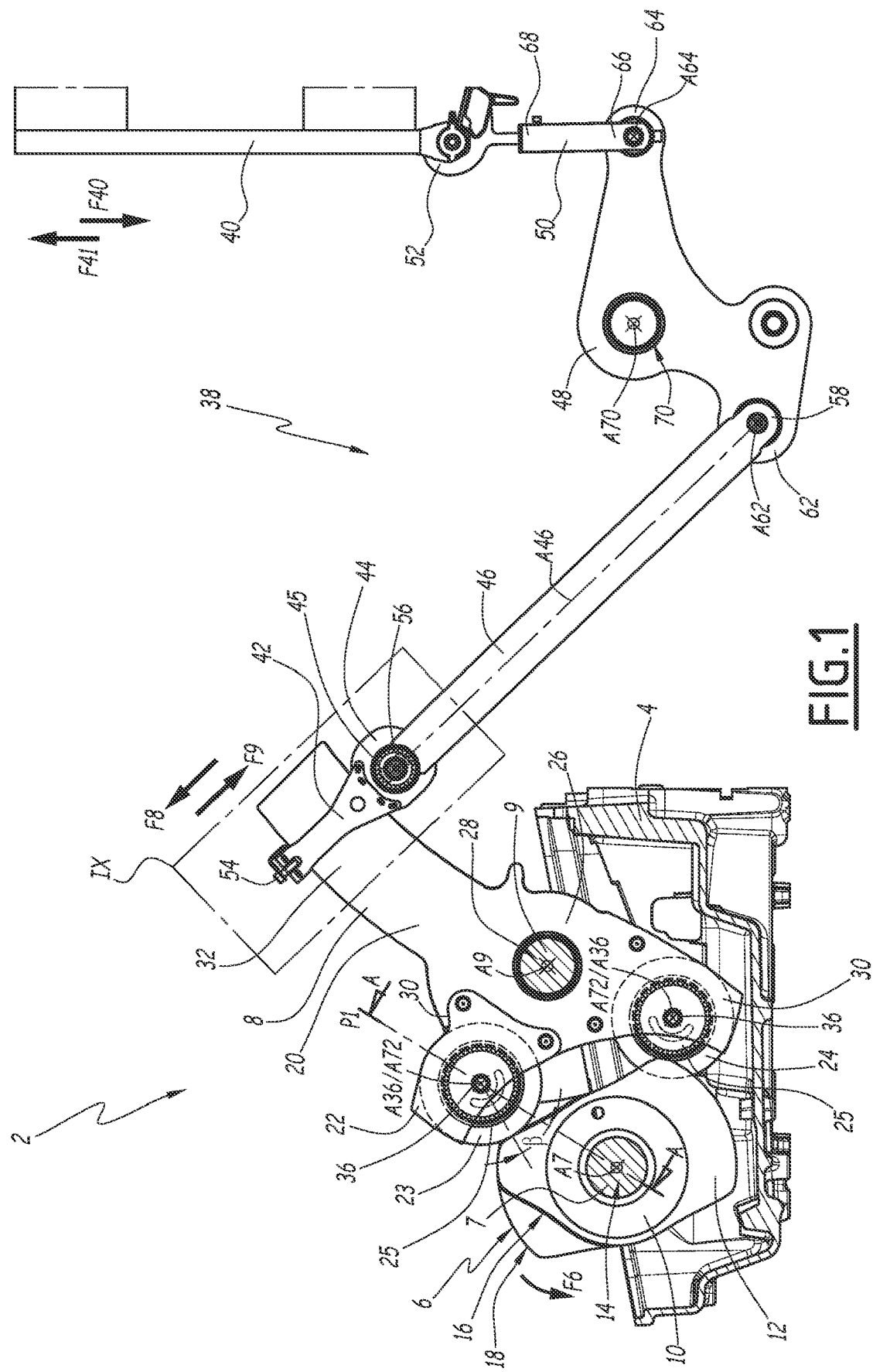
FIG. 1 is a schematic view of a shed forming machine, comprising bearings according to a first and a third embodiment of the invention, the shed forming machine being shown in a first configuration.

FIG. 1 shows a shed forming machine 2, which is shown schematically for ease of understanding. The shed forming machine 2 is here a cam machine.

The machine 2 comprises a frame 4, a set of main cams 6 and a set of output levers 8. In practice, several main cams 6 are mounted on a common shaft 7 and juxtaposed along a longitudinal axis A7 of this shaft 7. Similarly, several levers 8 are mounted on a common shaft 9 and juxtaposed along a longitudinal axis A9 of this shaft 9. The frame 4 is fixed when using the machine 2 and comprises the various necessary members for the positioning of the other elements of the shed-forming machine 2 and the driving of the levers 8. A cover (not shown) closes the frame 4 at the top and allows the passage of the levers 8. In the remainder of this description, the cam 6 and the lever 8 in question are those visible in FIG. 1.

The cam 6 comprises a central portion 10 and a peripheral portion 12. The central portion 10 has a cylindrical shape with a circular section centered on the axis A7. A bore 14 is formed through the central portion 10, the bore 14 being centered on the axis A7.

The peripheral portion 12 extends radially to the central portion 10 relative to the axis A7 and defines two tracks 16 and 18, the tracks 16 and 18 each having a profile with a radial surface offset with respect to a plane of the lever 8 and intended to be in contact with other mechanical elements, as described later in the present description.

In the example illustrated, the cam 6 is made from a single piece of metal, the tracks 16 and 18 being produced by machining.

The cam 6 is mounted on the shaft 7 interacting with the bore 14 and centered on the axis A7. The cam 6 is thus movable in rotation relative to the frame 4 around the axis A7, the rotational movement of the cam 6, represented by the arrow F6 in FIG. 1, being controlled by drive means (not shown) known per se.

The output lever 8 comprises a web 20, two flanges 22 and two drive rollers 23 and 24. The rollers 23 and 24 each comprise a bearing 25, which conforms to a first embodiment of the invention.

The web 20 of the lever 8 is formed in a plate, preferably metallic, and comprises a central part 26, which is traversed by a bore 28 of circular shape and centered on the axis A9.

The axis A9 is parallel to the axis A7, the output lever 8 being mounted to pivot relative to the frame 4 about the axis A9 by means of bearings interacting with the bore 28 and with the shaft 9. These bearings are not shown.

The core 20 of the lever 8 further comprises two extensions 30 and an arm 32. The two extensions 30 and the arm 32 are connected to the central part 26, the extensions 30 and the arm 32 extending radially to the axis A9 following different directions from each other.

In the example illustrated, the arm 32 and one of the two extensions 30 each extend in a direction opposite to the other with respect to the axis A9, while the other extension 30 extends in a direction forming a right angle with the direction of the first extension, the vertex of the right angle being situated on the axis A9.

The two flanges 22 are each secured respectively to one or other of the lateral surfaces of the web 20 of the lever 8 by means of fixing elements 34 and have, in a direction parallel to the axis A9, a profile superimposed on the profile of the respective extensions 30.

In the example illustrated, the flanges 22 are made of metal, and the fixing elements 34 are, for example, in the form of a screw-nut pair, or else of a rivet.

Each of the flanges 22 defines, in interaction with the extension 30 on which this flange 22 is fixed, a volume to accommodate one of the two drive rollers 23 or 24 located along one of the two lateral surfaces of the web 20. In FIG. 1, the roller 23 is located higher than the roller 24.

Advantageously, the bearings 25 of the rollers 23 and 24 have the same structure and operate in the same way. The detailed structure of the bearings 25 is described later in this description.

Each of the drive rollers 23 or 24 is mounted, via a bearing 25, on the output lever 8 by means of fixing elements 36, which jointly interact with a flange 22 and the web 20 of the lever 8.

Each of the fixing elements 36 defines an axis A36, which is parallel to the axis A9 of the output lever 8 and therefore to the axis A7 of the cam 6.

In the example illustrated, the fixing elements 36 are rivets.

The shape of the cam 6, in particular the profiles of the tracks 16 and 18, as well as the relative positioning of the cam 6, the output lever 8 and the drive rollers 23 and 24, is designed to ensure permanent contact of each of the drive rollers 23 or 24 with one of the respective tracks 16 or 18.

It will be understood that the continuous rotational movement of the cam 6, represented by the arrow F6, is transformed into a reciprocating oscillation movement of the output lever 8. The oscillating movement of the lever 8 around the main axis A9 is represented by the arrows F8 and F9 in FIG. 1, the arrows F8 and F9 representing the movements of one end of the arm 32 remote from the axis A9.

The cam machine 2 further comprises a mechanical transmission system 38, which connects the output lever 8 to a heddle frame 40. In the example illustrated, the transmission system 38 comprises an adjustable clip 42, a roller transmission 44 with a bearing 45, a drive rod 46, a drive lever 48, a link 50 and an attachment to the frame 52 connected to one end of the frame 40. A link (not shown) articulated on the drive lever 48 connects the latter to another lever of the same type located near another end of the frame 40 which is not visible in the figures.

The bearing 45 of the roller 44 is a bearing according to a second embodiment of the invention, which is described in detail later in this description.

The position of the clip 42 along the arm 32 is adjustable by a user, by means of an adjusting member 54 influencing the geometric shed parameters of the frame 40. The roller 44 is fixed to the clip 42. Once the position of the clip 42 relative to the arm 32 defined, the transmission roller 44 is integral with the arm 32, i.e. the transmission roller 44 follows the oscillating movements of the arm 32 indicated by the arrows F8 and F9.

The transmission roller 44 defines a pivot axis A44, the pivot axis being parallel to the axes A9 and A7.

The drive rod 46 has an elongated shape, which defines a longitudinal axis A46, and comprises a first end 56 and a second end 58, opposite the first end 56.

The first end 56 is mounted on the transmission roller 44 to rotate around the pivot axis A44.

The adjustable clip 42, the drive roller 44 and the drive rod 46 together provide a kinematic pivot connection around the axis A44. The structure of the transmission roller 44 and of the assembly to the drive rods 46 and clips 42 is detailed later in this description.

The drive lever 48 comprises a body 60, which is formed in a plate, which comprises a double L-shaped baffle shape and which defines a first end 62 and a second end 64, opposite to the first end 62. The first end 62 has a bore, which is centered on an axis A62 and which accommodates connecting members (not shown) capable of ensuring rotational mobility of the connecting rod 46 relative to the lever 48 around the axis A62.

Similarly, the second end 64 comprises a bore (not shown) which is centered on an axis A64 and accommodates connecting members capable of connecting a first end 66 of the rod 50 to the second end 64 of the lever 48, so as to allow rotational mobility of the rod 50 relative to the lever 48 around the axis A64.

The link 50 further comprises a second end 68, opposite the first end 66, on which the clip to the frame 52 is fixed.

The drive lever 48 further comprises a central bore 70, located at a distance from the first and second ends 62 and 64 and centered on an axis A70. The central bore 70 accommodates connecting members, which are, on the one hand, integral with a frame (not shown) of the loom including the frame 40 and which, on the other hand, allow the rotational movements of the drive lever 48 about the axis A70.

The axes A62, A64 and A70 are parallel to each other and to the axes A7 and A9.

It is to be understood that the mechanical transmission system 38, which comprises several articulations about the axes A62, A64 and A70, makes it possible to transmit the oscillating movement of the output lever 8, indicated by the arrows F8 and F9, in an amplified vertical oscillating movement of the heddle frame 40, indicated by arrows F40 and F41.

The heddle frame 40 oscillates between two high and low positions, and by extension it may be noted that the lever 8 itself oscillates between two high and low positions.

Figure 2:
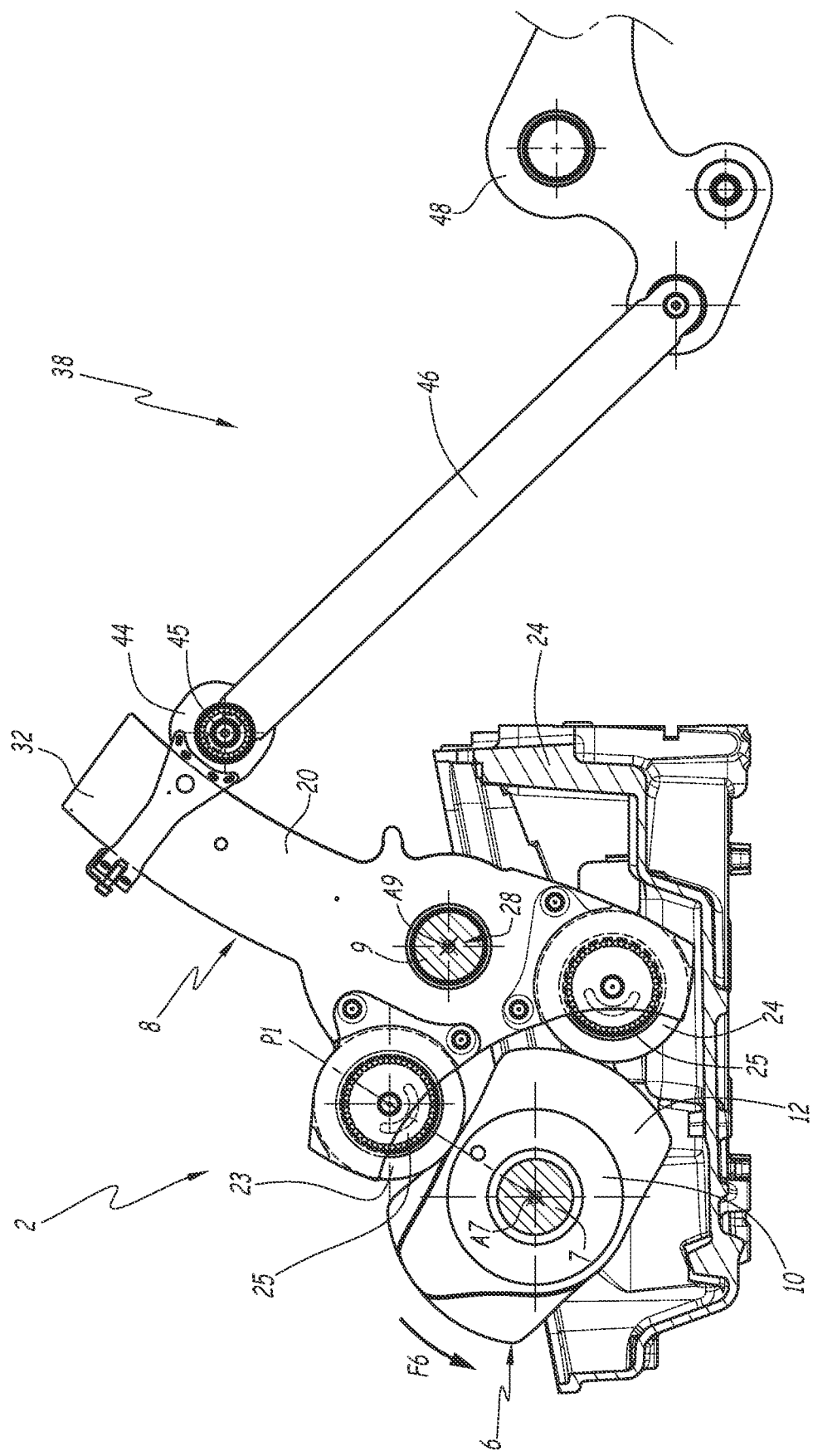
FIG. 2 is a view of part of the shed forming machine of FIG. 1, the shed forming machine being shown in a second configuration.

In FIG. 1, the cam 6 is shown in a first angular position relative to the frame around the axis A7. In FIG. 2, the cam 6 is shown in a second angular position relative to the frame 4, different from the angular position shown in FIG. 1. When the cam 6 makes a complete revolution around the axis A7, the machine 2 performs a so-called "shed forming" cycle.

The roller 23 approaches the axis A7 passing from the configuration of FIG. 1 to the configuration of FIG. 2 by rotating the cam 6 in the direction of the arrow F6, which results in a pivoting movement of the lever 8 around the axis A9 in the direction of arrow F8. When the rotation of the cam 6 in the direction of the arrow F6 continues, the profile of the tracks 16 and 18, interacting jointly with the drive rollers 23 and 24, continuously generates the reciprocating movement of oscillation in the directions of the arrows F8 and F9, this movement being taken up by the mechanical transmission system 38 to move the frame 40 alternately in the direction of the arrows F40 and F41.

Figure 3:
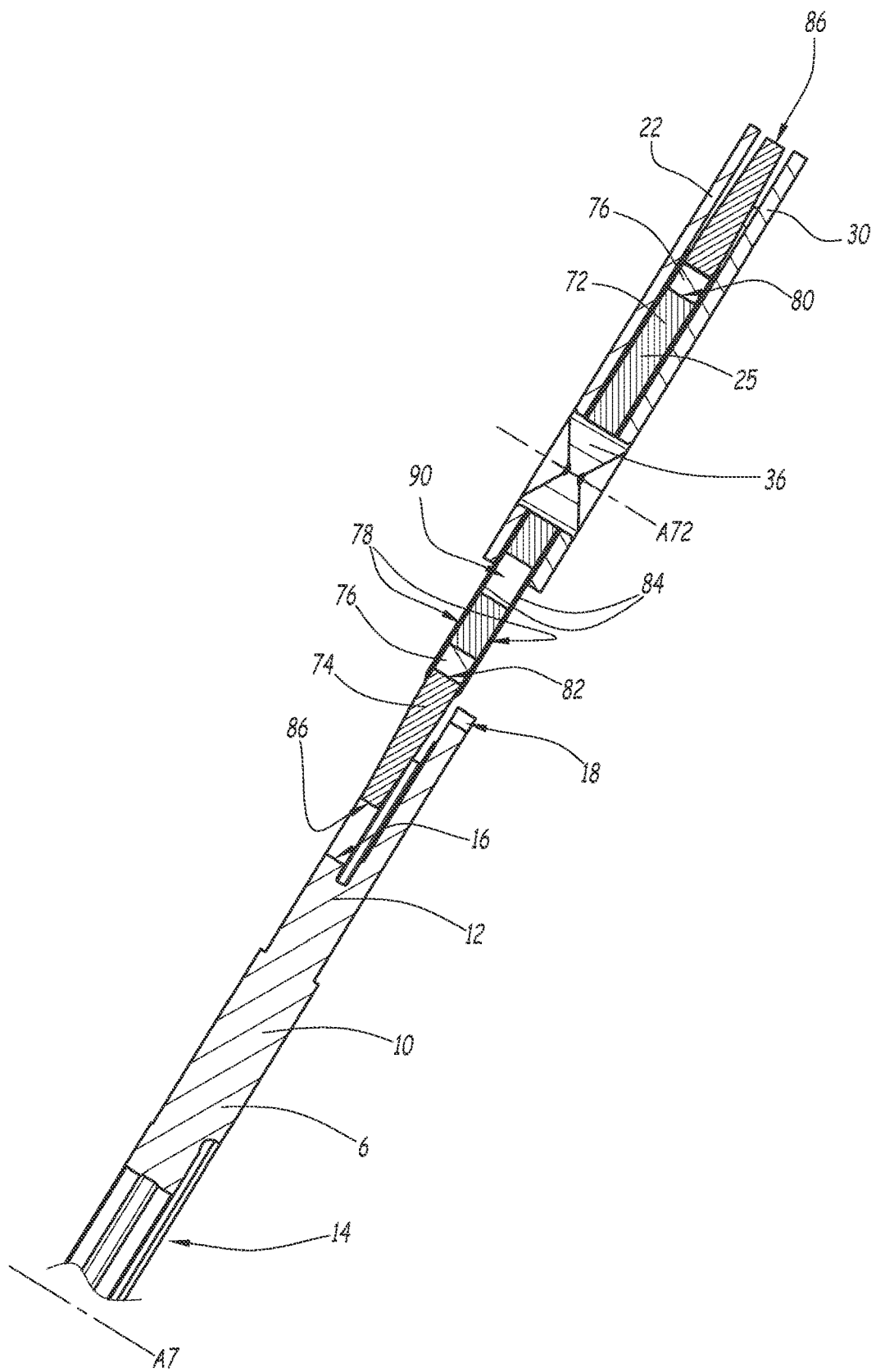
FIG. 3 is a partial section, along a plane A-A shown in FIG. 1.

FIG. 3 represents, in section, the cam 6 and the roller 23, the roller 23 being mounted as a yoke between one of the extensions 30 and one of the flanges 22 of the lever 8 being secured thereto by means of the fixing members 36.

The roller bearing 25 of the roller 23 comprises an inner ring 72, an outer ring 74 and rolling elements 76.

Figure 4:
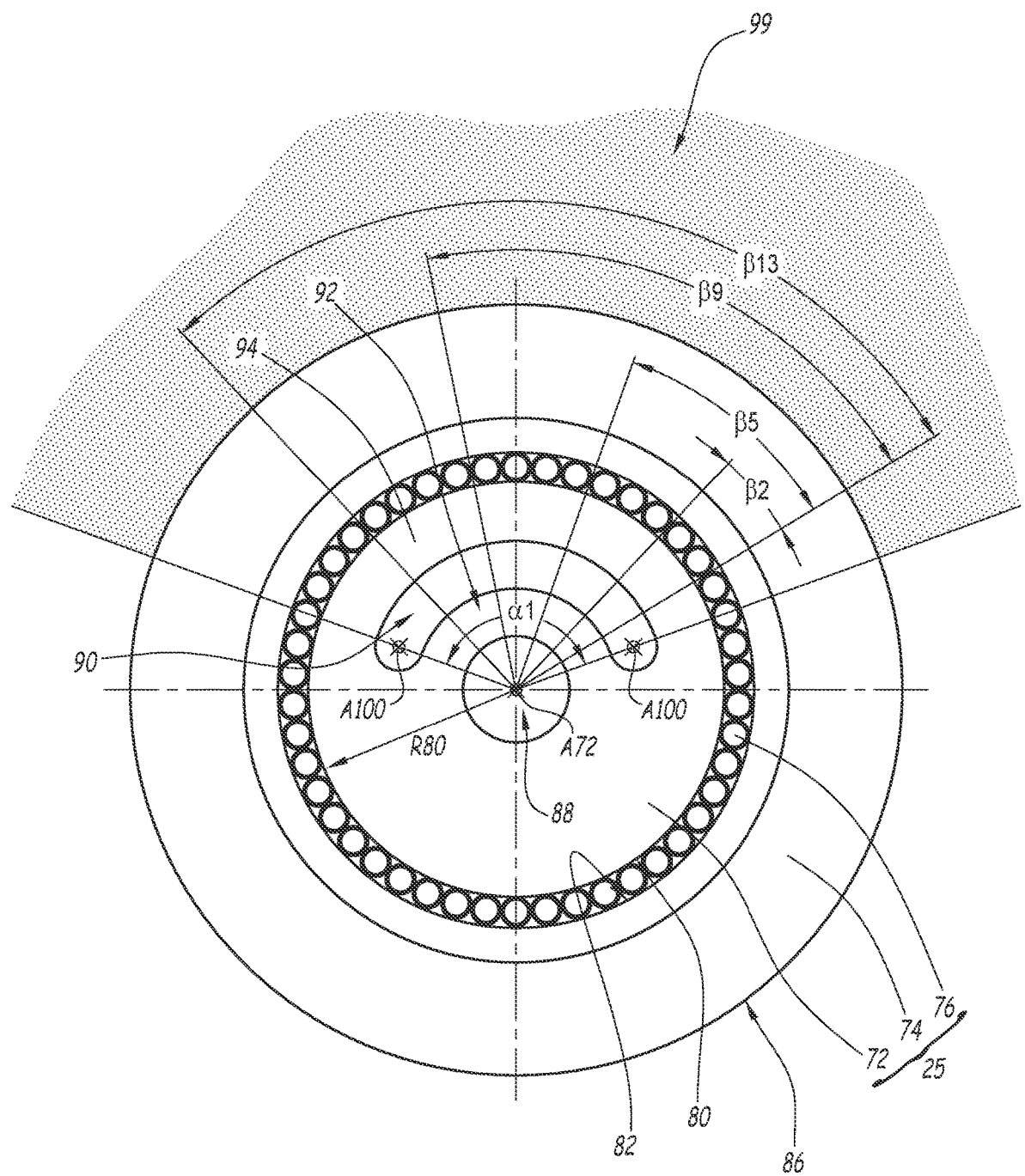
FIG. 4 is a front view of a bearing shown in section in FIG. 3.
Figure 5:
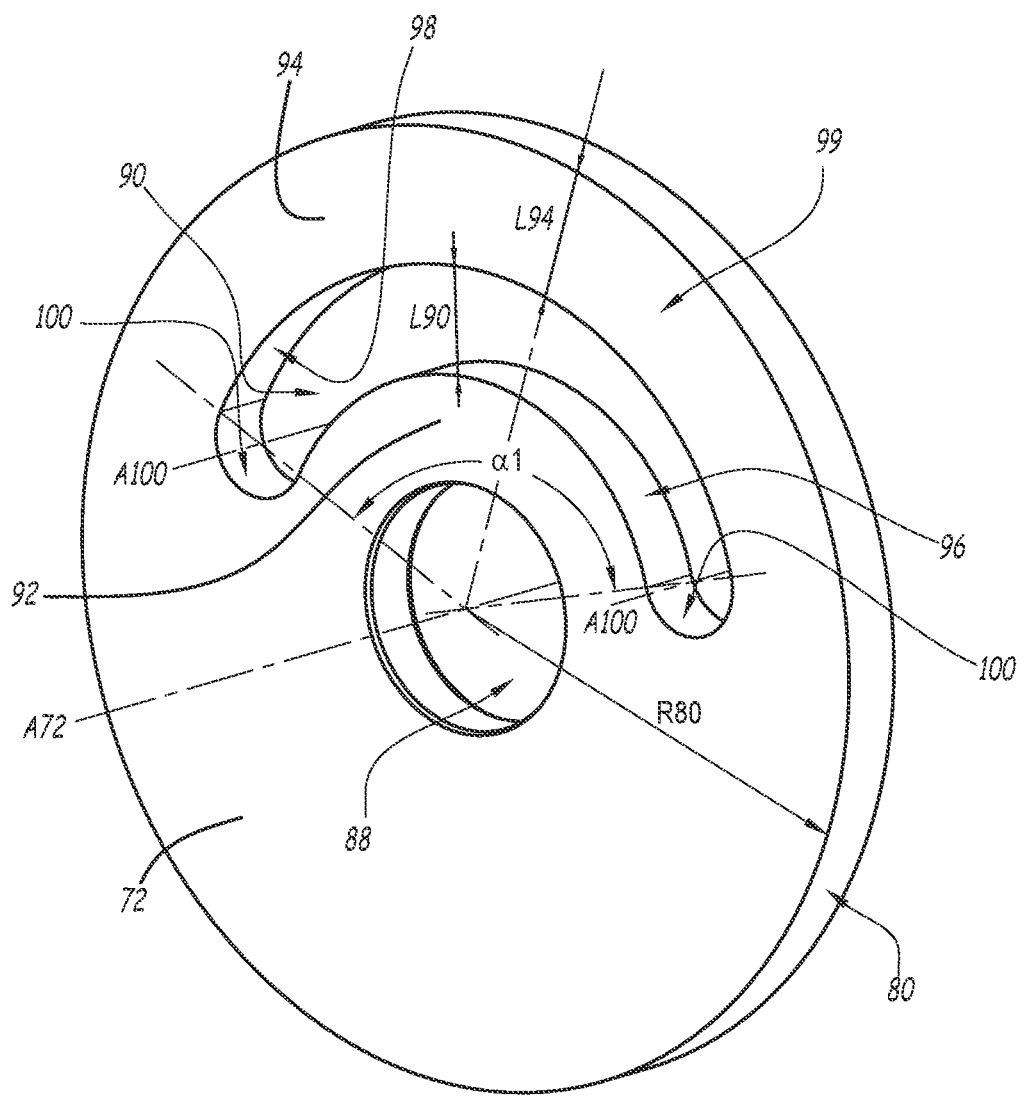
FIG. 5 is a perspective view of an inner ring of the bearing of FIG. 4.
Figure 7:
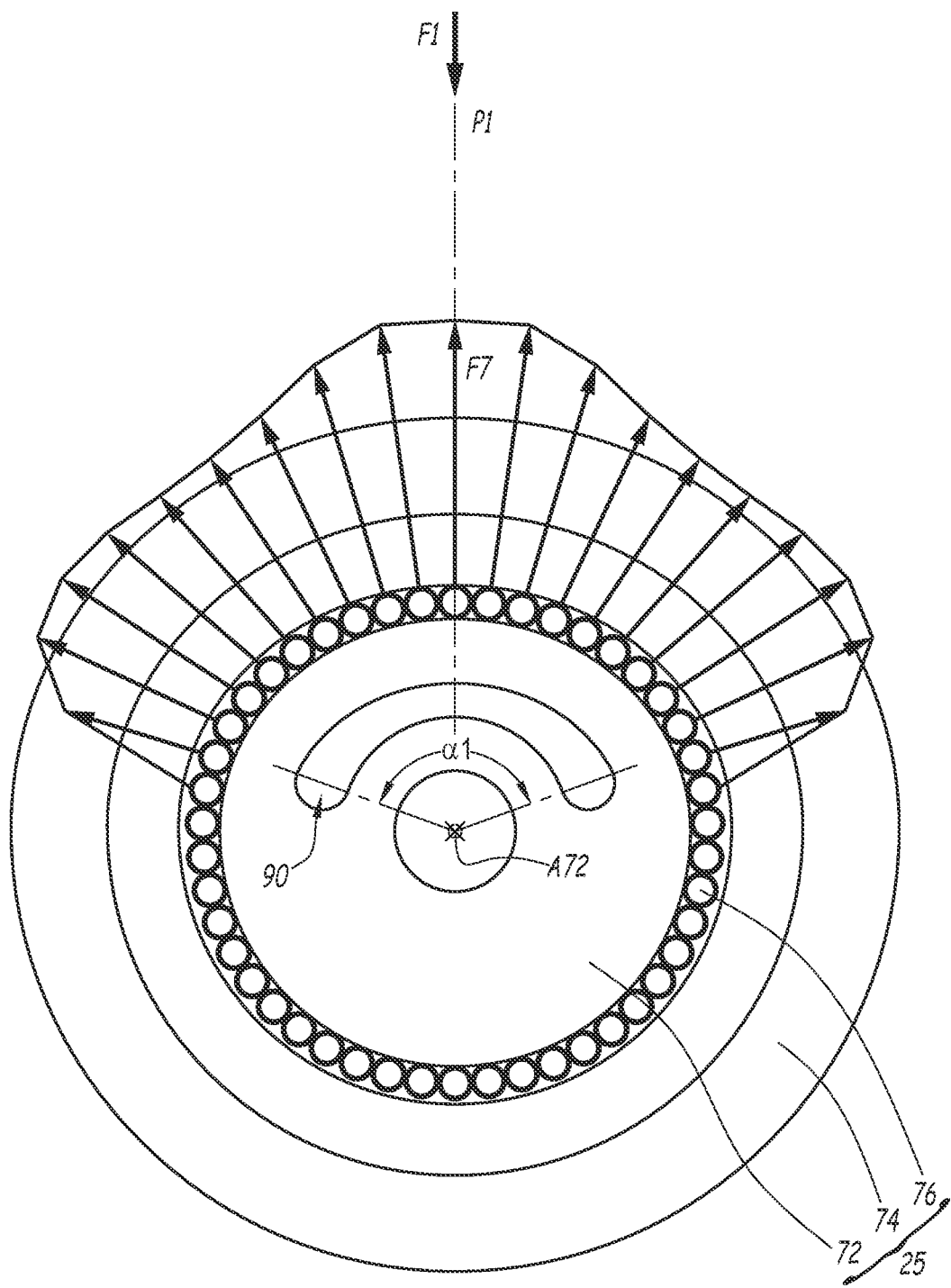
FIG. 7 is a front view of the bearing of FIG. 3, illustrating the behavior of the bearing under the effect of a load similar to that of FIG. 6.

The bearing 25 is also shown in FIGS. 4 and 7, while the inner ring 72 is shown alone and in perspective in FIG. 5.

The inner ring 72 is formed in a plate, preferably metallic, and has a circular outer shape centered on a main axis A72. The ring 72 has two lateral faces 78, which are parallel and radial to the main axis A72, and defines a peripheral path 80, which has the shape of a cylinder with a circular base centered on the main axis A72 and with a radius R80.

The outer ring 74 is made from a metal plate and has a ring shape. It defines an inner path 82, which has the shape of a cylinder with a circular base centered on the axis A72 and is located opposite the peripheral path 80 of the inner ring 72. In the example illustrated in FIG. 3, the ring 74 has a radial section in the form of a trapezoid with parallel or nearly parallel rings and with blanks converging in a centrifugal direction with respect to the axis A72.

The inner path 82 and the peripheral path 80 define between them a volume for accommodating the rolling elements 76. In other words, the rolling elements 76 are interposed, radially with respect to the main axis A72, between the peripheral path 80 and inner path 82. The rolling elements 76 are designed to guide the outer ring 74 in rotation relative to the inner ring 72 about the main axis A72.

In the example illustrated, the rolling elements 76 are cylindrical rollers, the axes of which are parallel to the main axis A72.

In a variant not shown, the rolling elements of the set of rolling elements 76 may be balls or tapered rollers, these examples being not limiting.

The bearing 25 further comprises two flanges 84, located on either side of the lateral surfaces 78 of the inner disc and which each extend, radially to the axis A72, so as to maintain the rolling elements 76 axially relative to the axis A72 and within the volume delimited by the peripheral 80 and inner 82 path. The flanges 84 are visible in FIG. 3 and have the role of guiding and containing the rolling elements 76 axially in the reception volume formed between the path 80 and 82 by interaction with the end of the rolling elements 76, and also have the role of defining an offset space, between the surfaces of the outer ring 74 of the bearing 25 and the flanges 22 of the lever 8, for their free rotation around the axis A72.

The crown 74 further has an outer track 86 which is a cylindrical surface of circular section centered on the main axis A72.

The bearing 25 also comprises a fixing hole 88, which is formed in the inner ring 72 and which interacts with the fixing elements 36 for mounting the roller 23 on the lever 8. In the example illustrated, the hole 88 is centered. on the main axis A72.

The inner ring 72 is thus fixed to the output lever 8, while the outer ring 74 is movable in rotation around the main axis A72 relative to the output lever 8.

It should be understood that the outer ring 74, in contact with one of the tracks 16 or 18 of the cam 6 via the external track 86, "rolls" on the corresponding track 16 or 18, which reduces the friction and wear of parts. In this sense, the outer track 86 is a peripheral rolling track of the outer ring 74.

Consequently, the forces generated by the contact of the tracks 16 or 18 on the roller 23 are oriented radially to the main axis A72, whatever the angular position of the cam 6 and whatever the place of contact between the cam 6 and the outer track 86 of the outer ring 74.

The inner ring 72 further comprises a slot 90. The slot 90 is formed in the thickness of the inner ring 72 and opens onto the two lateral surfaces 78. The slot 90 separates, radially to the main axis A72, a central sector 92 of the inner ring 72 of a material bridge 94, the material bridge 94 forming a portion of the peripheral path 80. In other words, the slot 90 extends facing a portion of the path 80. By "facing" is meant that the slot 90 extends close to the peripheral path 80 in a similar manner, or else the slot 90 extends along the path 80 or a portion of the profile of the slot 90 approaches a portion of the profile of the path 80.

The slot 90 has an inner edge 96 and an outer edge 98, the inner and outer edges 96 and 98 being interconnected by two connectors 100, which constitute rounded ends of the slot 90.

In the example illustrated, the inner and outer edges 96 and 98 are portions of cylinders centered on the main axis A72, while the fittings 100 are also portions of a cylinder of circular section, each centered on a respective axis A100, the axes A100 being parallel to the main axis A72. In particular, the spacing between the inner 96 and outer 98 edges is constant.

The inner and outer edges 96 and 98 define between them a radial width L90 of the slot 90, measured radially to the axis A72. Similarly, a radial width L94 of the material bridge 94 is defined as being a width, measured radially to the main axis A72, between the outer edge 98 of the slot 90 and the outer track 86 of the outer ring 74.

An angular sector 99 is defined as a dihedron centered on the axis A72 and the sides of which pass through the axes A100 of the fittings 100. The angular sector 99 is represented in gray in FIG. 4. We denote as α1 the angle carried by the main axis A72 connecting the axes A100 of the two connectors 100. The angle at the vertex α1 of the angular sector 99 of the inner ring 72 thus jointly represents the angular extent of the slot 90 and the angular extent of the material bridge 94.

We define a plane P1 as being a plane passing through the axis A7 of the cam 6 and through the axis A72 of the bearing 25. We also define a load angle β as being the measurement of an angle, carried by the main axis A72 of the bearing 25, between the plane P1 and the place of contact between the outer ring 74 of the bearing 25 and the cam 6. In FIG. 1, the load angle β is non-zero. In FIG. 2, the cam 6 is in a different position than in FIG. 1, in which the load angle β is zero.

More generally, it is to be understood that during a shed formation cycle, the intensity and the place of application of the contact force between the roller 23 and the cam 6 change cyclically.

This contact place moves alternately on either side of the plane P1 and the load angle β alternately takes positive or negative values between two extreme values, defining a radial load zone of the bearing 25. The force applied by the cam 6 on the roller 46 thus has a cyclically variable direction and intensity. In particular, the force experienced by the rolling elements 76 has a maximum value during a shed formation cycle.

In the example illustrated, the plane P1 is a plane of symmetry of the inner ring 72 of the bearing 25, in other words the plane P1 is a plane of symmetry of the slot 90 of the bearing 25.

Figure 6:
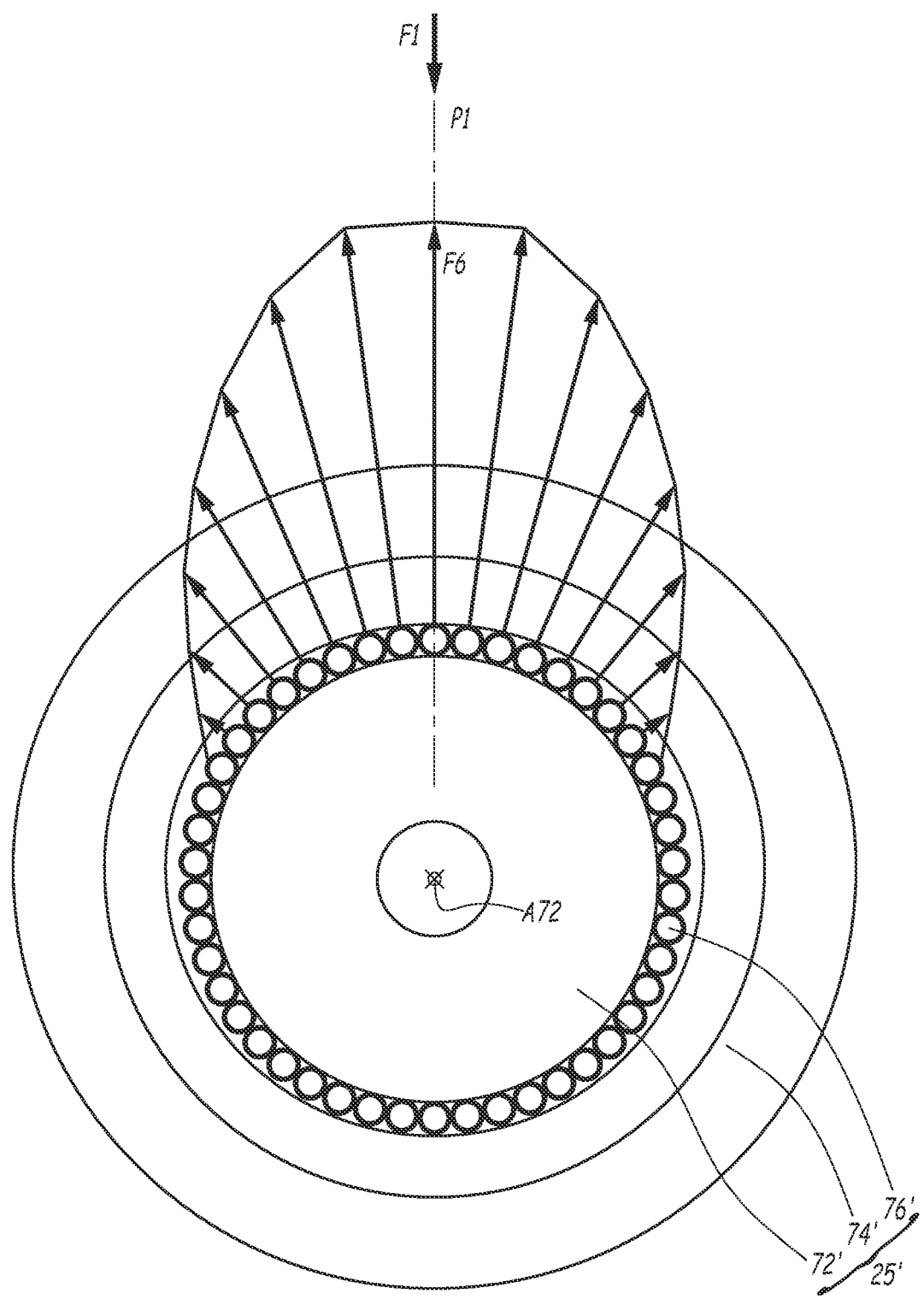
FIG. 6 is a front view, similar to FIG. 4, of a state-of-the-art bearing, illustrating the behavior of this bearing under the effect of a load.

FIG. 6 shows the result of a numerical simulation of the behavior of a state-of-the-art bearing comprising an inner ring 72', an outer ring 74' and rolling elements 76'. The bearing 25' according to the state of the art has a structure similar to that of the bearing 25 according to the first embodiment of the invention, one of the differences being that the bearing 25' does not include a slot, of the type of the slot 90, nor of the material bridge, of the type of material bridge 94. FIG. 7 represents the results of numerical simulation of the behavior of the bearing 25 of FIGS. 3 to 5 and 7, in accordance with a first embodiment of the invention.

In FIGS. 6 and 7, the bearing 25 or 25' is subjected to a force of the same intensity and direction, represented by an arrow F1 oriented towards the main axis A72 of the bearing. This force comes from the driving torque of the camshaft against the forces of the frame 40 and the pulling elements which act in motion and weigh on the bearing 25 or 25' concerned. The deformation of the parts under the effect of the force F1 is represented in an exaggerated manner in each of FIGS. 6 and 7 to illustrate the effect of the invention in FIG. 7. The direction and intensity of the force resulting from the contact forces at the level of each rolling element 76 are represented by an arrow, the direction of which is that of the force resulting from the contact forces of the rolling elements and the length of which is proportional to the intensity of said resulting force.

In FIG. 6, the outer ring 74' is oval in a direction orthogonal to the direction of arrow F1, while the inner ring 72' does not show any deformation. Furthermore, only fifteen rolling elements 76' contact the outer ring 74'. The longest arrow is denoted F6, representing, in FIG. 6, the maximum contact force of the bearing 25 under the load.

In FIG. 7, the outer ring 74 has a deformation similar to the outer ring 74' of the roller according to the state of the art, but the inner ring 72 is, for its part, elastically deformed under the action of the roller force F1. On the other hand, nineteen rolling elements 76 are subjected to a force. The elastic deformation of the inner ring 72, exaggeratedly represented by a crushing of the slot 90, allows a greater number of rolling elements 76 to generate a resultant force against the application of the force F1. The arrow representing the maximum contact force of the bearing under the load is denoted F7 in FIG. 7.

In the example shown, the arrow F7 has a length that is a half shorter than the arrow F6. In other words, the maximum force undergone by the rolling elements 76 of the bearing 25 according to the invention is approximately less than half the maximum force undergone by the rolling elements 76' of the bearing 25' according to the state of the art, this being particularly advantageous for reducing material fatigue.

As described above, the load angle β varies continuously between two extreme values during operation on either side of the plane P1. The angular sector 99 of the slot 90 must thus be sufficiently large, therefore the angle at the vertex α1 must be sufficiently large, so that the elastic deformation of the inner ring 72 is sufficient, whatever the value of the load angle β.

According to examples, the loading zone is aligned with the angular sector 99 of the slot 90. According to other examples, the slot 90 extends on either side of a center line directed according to the maximum intensity of the contact force between the bearing 25 and the cam 6. According to other examples, the slot is symmetrized with respect to a median plane, which itself symmetrizes the extent of the rolling zone between the cam 12 and the roller 23, 24 on a full shed forming cycle.

In practice, the slot 90 extends over an angular sector 99 of the inner ring 72, the vertex angle α1 of which is greater than 20°. Preferably, the vertex angle α1 is greater than 70°, more preferably greater than 120°. Conversely, it is understood that a vertex angle α1 which is too large risks weakening the inner ring 72 over the extent of the corresponding material bridge 94, which is the reverse of the desired effect. In practice, especially if the material bridge 94 is limited in thickness, the value of the vertex angle α1 is less than 160°.

Since the force to which the drive roller 23 is subjected is distributed over the rolling elements 76, the vertex angle α1 of the angular sector 99 may also be expressed as a function of the number of rolling elements 76 over which the load is distributed.

In FIG. 4, β2 is defined as being an angle at the vertex of an angular sector of the inner ring 72 corresponding to the angular sector occupied by two consecutive rolling elements 76. Similarly, angles at the vertex β5, β9 and β13 are defined as being angular sectors of the ring 72 corresponding to the angular sector occupied by five, nine and thirteen consecutive rolling elements 76 respectively.

Thus, the slot 90 extends over an angular sector 99 whose apex angle α1 is greater than or equal to the vertex angle β2. Preferably, the vertex angle α1 is greater than or equal to the vertex angle β5. More preferably, the vertex angle α1 is greater than or equal to the vertex angle β9. Even more preferably, the vertex angle α1 is greater than or equal to the vertex angle β13.

When the bearing 25 is subjected to a contact force, the radial width L90 of the slot 90 should be large enough to prevent the inner edge 96 and the outer edge 98 from coming into contact with each other under the effect of the load applied to the roller 23.

The slot must thus have a width L90 greater than or equal to 5% of the radius R80 of the peripheral path 80. Preferably, the width L90 is greater than 10% of the radius R80. More preferably, the width L90 is greater than 20% of the radius R80.

Under the effect of the load, the material bridge 94 deforms elastically. Conversely, a material bridge 94 having too large a radial width L94 would be too rigid and would not deform under load. Thus, the material bridge 94 has a radial width L94 of less than 30% of the radius R80 of the path 80 of the inner ring 72, preferably less than 20%, more preferably less than 10%.

Conversely, it is to be understood that if the radial width L94 of the material bridge 94 is too small, the material bridge 94 risks being weakened, or even deforming plastically, which is not desirable. This is why, in practice, the width L94 is greater than 20% of the radius R80. Those skilled in the art will, of course, know how to determine the acceptable limits of the radial width L94 depending, in particular, on the geometry of the slot 90, the load cycle undergone by the bearing 25 and the material of the inner ring 72.

In the example illustrated, the radial width L94 of the material bridge 94 is substantially equal to the radial width L90 of the slot 90. By "substantially equal" is meant that the radial widths L90 and L94 are equal to each other within 50%, preferably within 20%.

Figure 8:
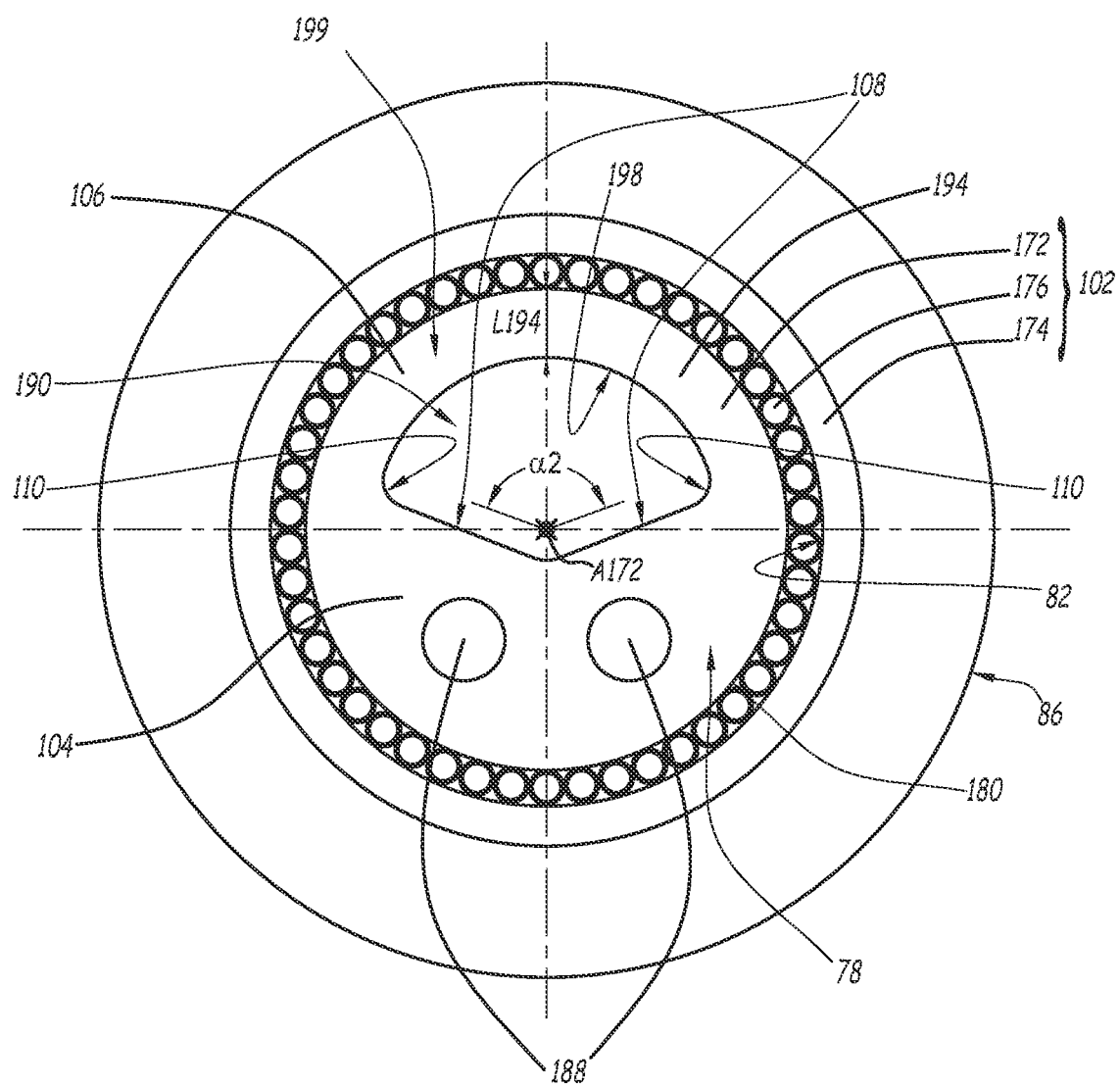
FIG. 8 is a front view similar to FIG. 4, of a bearing according to a second embodiment of the invention.
Figure 9:
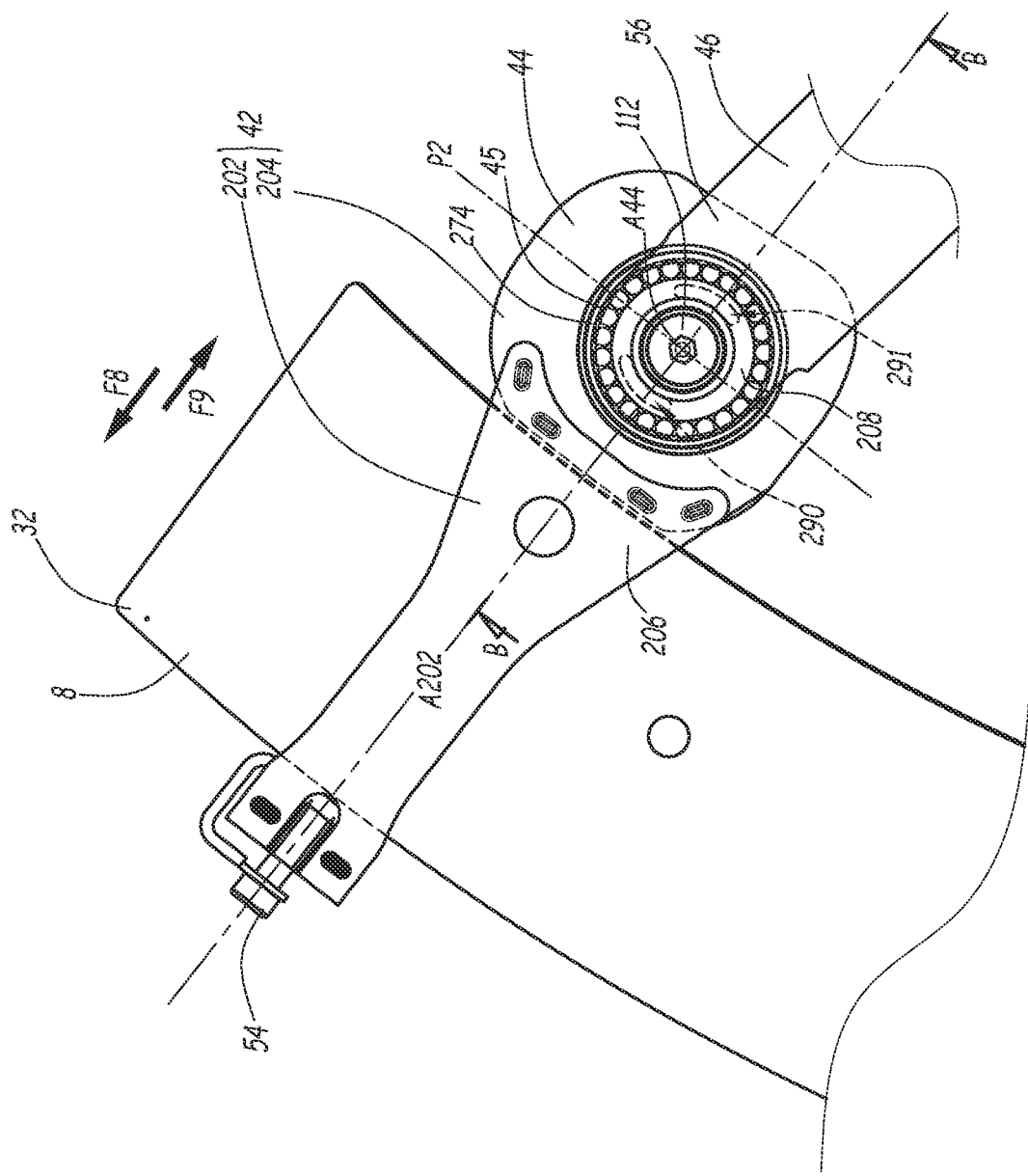
FIG. 9 is a front view on a larger scale of detail IX of FIG. 1, showing a movement transmission member comprising a bearing according to the third embodiment of the invention.
Figure 10:
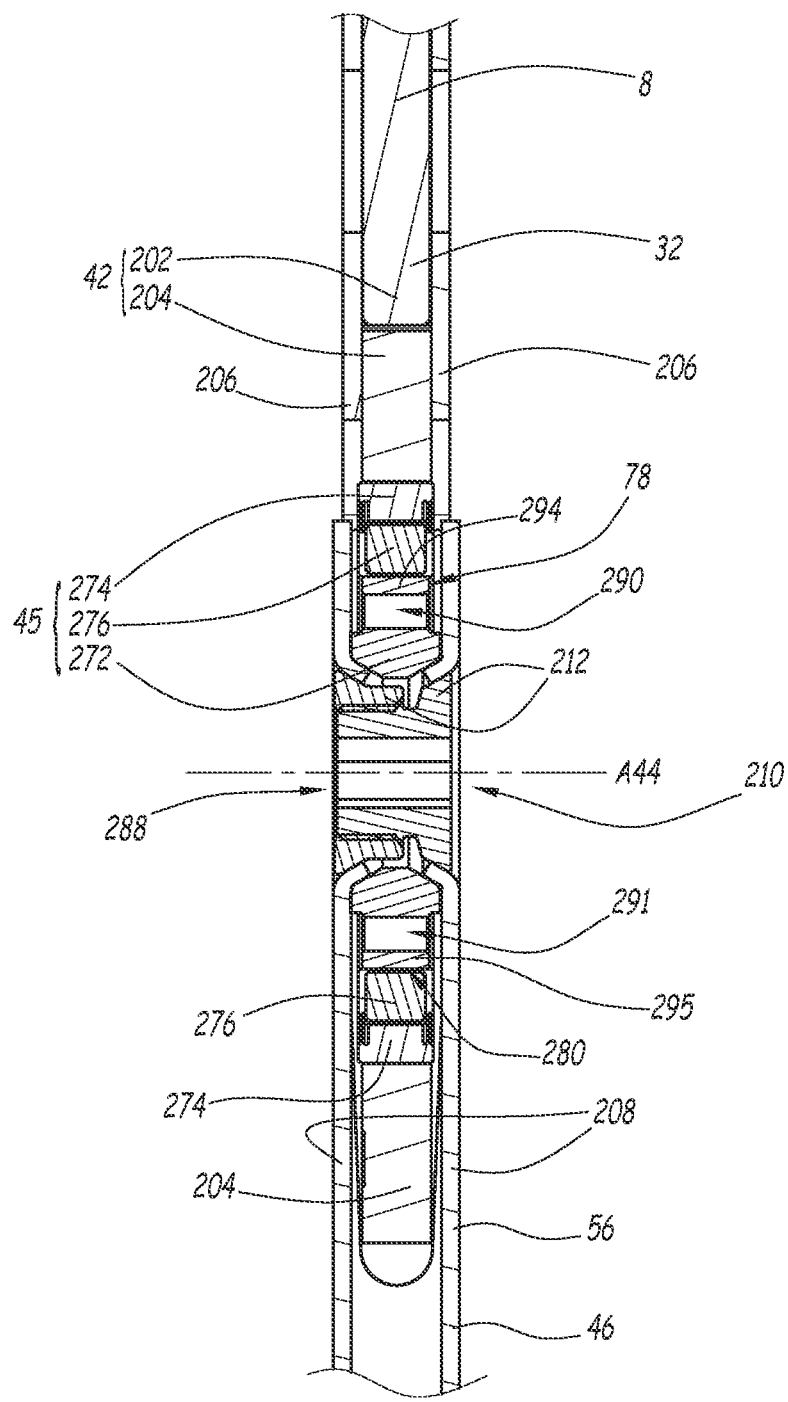
FIG. 10 is a section, along a plane B-B shown in FIG. 9.
Figure 11:
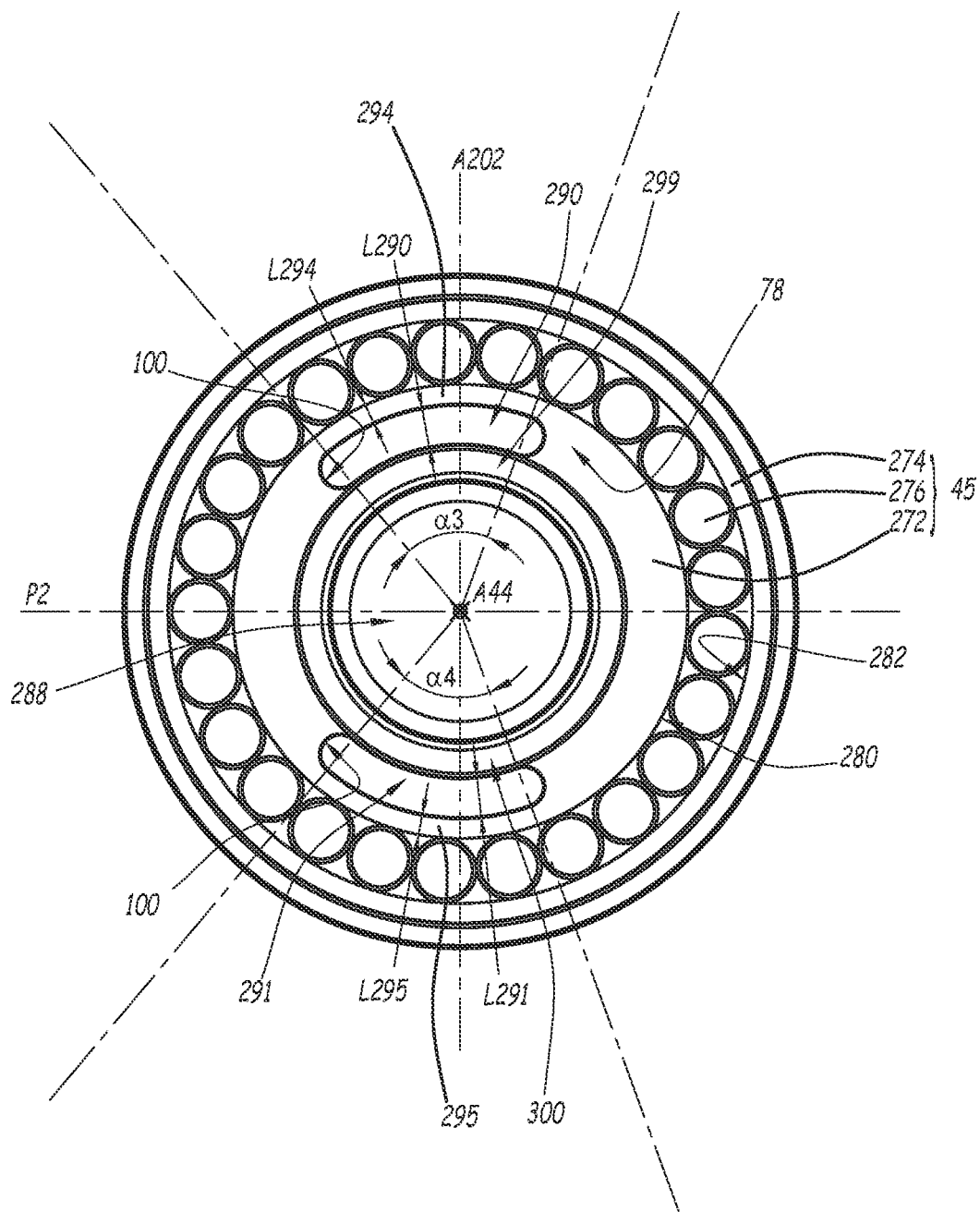
FIG. 11 is a front view of the bearing of FIG. 8.

In the second and third embodiments of the bearing according to the invention, shown respectively in FIG. 8 and in FIGS. 9 to 11, elements similar to those of the first embodiment have the same references and operate in the same way. In the following, the differences between the second and third embodiments and the first embodiment are described in the main.

A bearing 102, in accordance with the second embodiment of the invention, is shown in FIG. 8.

The bearing 102 comprises an inner ring 172, which is in the form of a disc centered on an axis A172, has two lateral surfaces 78 and defines a peripheral path 180. The inner ring 172 is rotatable relative to the ring 174 around the axis A172, by means of the rolling elements 176 interposed between the peripheral path 180 and the inner path 82 of the outer ring 174.

The lower ring 172 comprises a first half-disc 104 and a second half-disc 106 complementary to the half-disc 104.

Two fixing holes 188 are formed through the half-disc 104. In the example illustrated, the two holes 188 are formed in an intermediate portion between the axis A172 and the peripheral path 180 and are arranged symmetrically on both sides of a plane of symmetry of the first half-disc 104 represented by a vertical line in FIG. 8. Advantageously, the fixing of the inner ring according to this embodiment on the output lever enables the fixing axes A36 to be brought closer to the axis A9 of the lever 8, which makes it possible to reduce the dimensions of the levers 8 and, more generally, to reduce the construction volume of the machine, which benefits the weight and the mechanical constraints of its components.

A slot 190 is formed in the inner ring 172, opening onto its two side surfaces 78. In the example illustrated in FIG. 8, the slot 190 is formed essentially in the second half-disc 106.

The slot 190 has the shape of a portion of a disc, with an outer edge 198 in the shape of an arc of a circle and an inner edge 196 which is formed by two planar faces 108. The faces 108 are connected to each other by a cylindrical connector centered on the axis A172 opposite the outer edge 198 with respect to the axis A172. The outer edge 198 is connected to each of the planar faces 108 by a respective connector 110. The fittings 110 are portions of a cylinder centered on a respective axis parallel to the main axis A172. The slot 190 extends over an angular sector 199, centered on the main axis A172, while its vertex angle is denoted by α2, measured around the axis A172, between the axes of the fittings 110.

In the example illustrated, the vertex angle α2 of the angular sector 199 is substantially equal to 120° and is equivalent to the vertex angle of an angular sector occupied by eighteen rolling elements 176. It is therefore greater than angles defined as the angles β2, β5, β9 and β13 for the first embodiment.

The slot 190 extends under a portion of the peripheral path 180 and forms a material bridge 194 between the outer surface 198 and the peripheral path 180. In the example illustrated, the material bridge 194 extends along an arc of a circle centered on the main axis A172 and has a constant radial width L194.

More generally, it is to be understood that the geometry and the location of the slot 190, as well as the number and the location of the fixing holes 188, are determined during the design of the bearing 102 so as to ensure a solid fixing of the bearing 102 by the positioning and sizing of the fixing elements on the inner ring 172, and a good distribution of the loads undergone by the rolling elements 176 thanks to the elastic deformation of the inner ring 172.

The bearing 45 of the third embodiment comprises an inner ring 272, centered on the axis A44 of the roller 44. The axis A44 is also the main axis of the inner ring 272. The inner ring 272 defines a peripheral path 280 and is movable in rotation with respect to the ring 274 around the axis A44, by means of the rolling elements 276 interposed between the peripheral path 280 and an inner path 282 of the outer ring 74.

The adjustable clip 42 comprises a yoke 202 and a head 204. The yoke 202 comprises two legs 206, which are elongated and extend along their length parallel to an axis A202 of the caliper 202. The legs 206 are located on either side of the arm 32 of the output lever 8 and are each connected to the head 204. In the example illustrated, the head 204 is welded to the tabs 206. Thanks to the adjustment member 54, the position of the clip 42 along the arm 32 of the lever 8 is adjustable by an operator, while during normal operation of the cam machine 2, the head 204 is integral with the output lever 8, i.e. in continuous contact without play and without the possibility of relative movement between these parts.

The head 204 has a central hole in which the bearing 45 is housed. More precisely, the outer ring 274 of the bearing 45 is received without play in the central hole of the head 204 of the clip 42. In a non-limiting manner, the head 204 has a central hole. The assembly of the bearing 45 to the clip 42 is carried out, for example, by shrinking or welding.

The drive rod 46 comprises, in the extension of the first end 56, two fixing flanges 208. The flanges 208 each have a hole 210, the hole 210 being located opposite one another, the walls of the flanges 208 converging towards one another in the vicinity of the holes 210. The flanges 208 interact with a hole 288 for fixing the inner ring 272, the holes 210 accommodating fixing elements 212 capable of securing the assembly of the flanges 208 to the inner ring 272. In the example illustrated, the fixing elements 212 are a screw-nut pair.

The drive rod 46 is thus integral with the inner ring 272, while the ring 74 is integral with the output lever 8 via the head 204 of the clip 42.

The inner ring 272 comprises two slots 290 and 291, visible, in particular, in FIG. 11. Each of the slots 290 and 291 is here similar to the slot 90 of the bearing 25 of the first embodiment. The two slots 290 and 291 open onto the two lateral surfaces 78 of the inner ring 272 and are here diametrically opposed to the central axis A44. More precisely, the slots 290 and 291 are arranged symmetrically on either side of a transverse plane P2, this plane P2 being orthogonal to the axis A202 of the caliper 202 and containing the axis A44 of the roller 44. In the figures, the slot 290 is closer to the lever 8 than the slot 291.

The slot 290 defines an angular sector 299, with a vertex angle α3, while the slot 291 defines an angular sector 300, with a vertex angle α4. In the example illustrated, the angular sectors 299 and 300 each cover an angular sector occupied by four rolling elements 276, and their respective apex angles α3 and α4 are substantially equal to 70°. The angles α3 and α4 are therefore greater than an angle defined as the angle β2 for the first embodiment.

In the example illustrated, the slots 290 and 291 have the same shape and the angular sectors α3 and α4 are equal to each other.

During a shedding cycle, when the output lever 8 moves in the direction of the arrow F9, the drive rod 46 is pushed back by the lever 8 and the inner ring 272 is in compression on the side of the slot 290. Similarly, when the output lever 8 moves in the direction of the arrow F8, the drive rod 46 is pulled by the lever 8 and the inner ring 272 is in compression on the side of the slot 291. It is to be understood that in the third embodiment, the bearing 45 and, in particular, the material bridge 294 or 295 associated with each of the slots 290 or 291 of the inner ring 272, are alternately urged in compression on one side or the other. other of the plane P2.

Each of the slots 290 or 291 allows the distribution of the forces on the rolling elements 276 during repeated cycles of compression or traction of the drive rod 46.

More generally, as the inner ring 272 is subjected to cyclic compressive forces mainly oriented in two different directions defining two distinct loading zones, the slots 290 and 291 are arranged around the axis A44 aligned in a respective manner with a loading zone, so as to promote the distribution of the forces on the rolling elements of the set of rolling elements 76 in the direction of said forces.

According to a variant (not shown) of the invention, the slots 290 and 291 each extend on either side of a center line directed according to the maximum intensity of the radial force exerted by the transmission system 38 on the bearing. 45.

According to another variant (not shown), the slot is symmetrized with respect to a median plane, which itself symmetrizes the extent of the radial load zone exerted by the lever 8 on the inner ring 272.

In a variant (not shown), the inner ring 272 may comprise more than two slots of the type of slots 290 and 291 so as to distribute the forces undergone by the rolling elements of the set of rolling elements 276.

More generally, in the example illustrated, the bearings 25 include a single slot 90 and a fixing hole 88. In a variant (not shown), the bearings of the type of bearings 25 may comprise two fixing holes similar to the holes of the bearing 102, or else arranged differently. According to another variant, the bearings of the type of bearings 25 may comprise two or more slots, similar to the slots 290 or 291 of the third embodiment.

Similarly, in a variant (not shown), the bearing 102 of the roller 44 may include only a single slot, of the type of the slots 94 or 194.

In all the embodiments, the vertex angle α1, α2, α3 or α4 of the angular sector 99, 199, 299 or 300 and the radial width L90 of a slot of the slot 90 type may be defined during the design of the inner ring 72, 172 or 272 as a function of the load angle β and the intensity of the forces to which the bearing 25, 102 or 45 is subjected during the shedding cycle. Similarly, the radial width L94 of the material bridge 94 or equivalent delimited by the slot 90 or equivalent may be adjusted during the design and manufacture, depending on the type of force and the distribution of the forces expected during use.

The slots of the type of slot 90 or 290 and 291 extend in an arc of a circle centered on the main axis of the inner disc, like the slot 90 centered on the axis A72 of the inner ring 72. In variant (not shown), the slots may extend along an arc of a circle centered on an axis offset from the axis A72. According to yet another variant, the slots do not have a constant curvature but may have a curvature which varies continuously.

According to another variant (not shown), the hole 88 made in the inner ring is replaced by one or more recesses, which open onto a single face of the inner ring of the bearing and which are able to interact with the lever 8 for their assembly.

According to another variant (not shown), the width L94 of the material bridge 94 formed by the slot 90 with the peripheral path 80, measured radially to the axis A72 between the outer edges 98 and the path 80, is not constant, but varies continuously, for example to adapt to a force to which the roller is subjected, which varies as a function of the load angle R. Thus certain sectors of the material bridge may be stiffened by increasing the radial thickness L94, and other sectors softened by a reduction in radial thickness L94, depending on the local stresses imposed by the cycle of the machine 2.

In the example illustrated in FIGS. 1 to 5, the shed forming machine 2 comprises a cam machine with rollers 23 and 24 each comprising a bearing 25 according to the first embodiment of the invention.

More generally, the rollers of this cam machine may include bearings of the type of bearings 25, 102 or 45, which makes it possible to reduce the risk of failure of the bearings and to increase the productivity of the cam machine, for example. by extending the maintenance intervals and/or by increasing the speeds of the shed forming machine 2 and/or by modifying the cam profiles 6 to impose more severe acceleration.

According to a variant of the invention that is not shown, the shed forming machine is of the dobby type and comprises a mechanical movement transmission system similar to the transmission system 38, which comprises a bearing of the type of bearing 45. For example, the axis A62 or the axis A64 may define an articulation with a bearing of the type of the present invention.

The above-mentioned embodiments and variations may be combined with each other to generate new embodiments of the invention.

The invention claimed is:

1. A bearing for a shed forming machine or a system for transmitting movement to the frames of a loom, comprising an inner ring, an outer ring and rolling elements, in which:
   the inner ring is centered on a main axis, comprises two lateral surfaces normal to the main axis and defines a peripheral path centered on the main axis,
   the outer ring defines an inner path, which is circular and centered on the main axis,
   the rolling elements are interposed, radially with respect to the main axis, between the peripheral path and the inner path, so as to guide the outer ring in rotation with respect to the inner ring around the main axis,
   wherein
   the inner ring comprises at least one slot, opening onto the two lateral surfaces, extending opposite a portion of the path of the peripheral path, and forms a material bridge between the slot and the peripheral path,
   the material bridge extends over an angular sector of the inner ring, the angular sector being centered on the main axis of the bearing and having a vertex angle greater than or equal to the vertex angle of an angular sector occupied by two rolling elements, and
   the inner ring further comprises at least one hole for fixing the bearing.

2. The bearing according to claim 1, wherein the vertex angle of the angular sector of the inner ring is greater than 20°.

3. The bearing according to claim 1, wherein the material bridge extends with a constant radial width (L94; L194; L294, L295) along an arc of a circle centered on the main axis of the inner ring.

4. The bearing according to claim 3, wherein the radial width is substantially equal to a radial width of the slot.

5. The bearing according to claim 4, wherein the radial width of the material bridge is less than 30% of a radius of the peripheral path of the inner ring.

6. The bearing according to claim 1, wherein the slot extends between two rounded ends of diameter equal to the width of the slot.

7. The bearing according to claim 1, wherein the rolling elements are rollers.

8. The bearing according to claim 1, wherein the rolling elements are balls.

9. The bearing according to claim 1, wherein a plurality of slots are provided in the inner ring.

10. The bearing according to claim 9, wherein the ring comprises two slots diametrically opposed relative to the central axis.

11. The bearing according to claim 1, wherein the inner ring comprises a slot and two fixing holes.

12. An output lever with cam mechanism follower rollers, the lever being equipped with two rollers, wherein at least one of the rollers comprises a bearing according to claim 1, the inner ring of the bearing being fixed to a core of the lever and/or to a flange attached to the lever by means of fixing elements, the outer ring having a peripheral rolling track with a circular profile.

13. A shed forming machine of the cam machine type, wherein it comprises an output lever according to claim 12.

14. The shed forming machine according to claim 13, wherein the output lever oscillates about a main axis of the cam machine between a high position and a low position according to a profile of the cam acting by contact on the peripheral rolling track of one of the rollers, the contact being made in a loading zone radially aligned with the angular sector of the inner ring in which the slot is formed.

15. The shed forming machine of the cam machine type or of the dobby type, comprising a mechanical transmission system to the loom designed around articulations of parallel axes between them, wherein one of the articulations comprises a bearing according to claim 1.

16. The shed forming machine according to claim 14, wherein the material bridge extends on each side of a center line, directed according to the maximum intensity of the contact force between the roller and the cam, or directed according to the maximum radial force on one of the joints of the transmission system which comprises a bearing, the maximum radial force corresponding to the radial load applied to the rolling elements, being the highest during a shed forming cycle.

17. The bearing according to claim 1, wherein the angular sector has a vertex angle greater than or equal to the vertex angle of an angular sector occupied by five rolling elements.

18. The bearing according to claim 1, wherein the angular sector has a vertex angle greater than or equal to the vertex angle of an angular sector occupied by nine rolling elements.

19. The bearing according to claim 1, wherein the angular sector has a vertex angle greater than or equal to the vertex angle of an angular sector occupied by thirteen rolling elements.

20. The bearing according to claim 1, wherein the vertex angle of the angular sector of the inner ring is greater than 70°.

21. The bearing according to claim 1, wherein the vertex angle of the angular sector of the inner ring is greater than 120°.

22. The bearing according to claim 4, wherein the radial width of the material bridge is less than 20% of a radius of the peripheral path of the inner ring.

23. The bearing according to claim 4, wherein the radial width of the material bridge is less than 10% of a radius of the peripheral path of the inner ring.

* * * * *